United States Patent
Williams et al.

(10) Patent No.: US 10,899,175 B2
(45) Date of Patent: Jan. 26, 2021

(54) WHEEL LOCK KEY ASSEMBLY AND WHEEL LOCK KEY RETENTION MECHANISM

(71) Applicant: Toyota Motor Engineering & Manufacturing North America, Inc., Plano, TX (US)

(72) Inventors: Dale R. Williams, Cambridge (CA); Matt R. Cormier, Cambridge (CA); Philip A. Lavallee, St. George (CA)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 262 days.

(21) Appl. No.: 16/183,225

(22) Filed: Nov. 7, 2018

(65) Prior Publication Data

US 2020/0139760 A1    May 7, 2020

(51) Int. Cl.
  *B60B 29/00* (2006.01)
  *F16B 39/284* (2006.01)
  *B60B 3/16* (2006.01)
  *B23P 19/06* (2006.01)

(52) U.S. Cl.
  CPC .......... *B60B 29/00* (2013.01); *B60B 3/165* (2013.01); *F16B 39/284* (2013.01); *B23P 19/069* (2013.01); *B23P 2700/50* (2013.01)

(58) Field of Classification Search
  CPC .... F16B 39/284; F16B 23/0007; F16B 39/34; B60B 29/00; B60B 3/165; B60B 29/003; B23P 2700/50; B23P 19/069; B25B 13/06; B25B 13/48; B25B 23/02

USPC .............. 70/225, 229–232, 237, 259, 260, 70/DIG. 57; 81/125; 411/402, 407, 408
  See application file for complete search history.

(56) References Cited

U.S. PATENT DOCUMENTS

| | | | | |
|---|---|---|---|---|
| 5,347,892 A | * | 9/1994 | Moetteli | B25B 23/0035 279/79 |
| 6,571,588 B1 | * | 6/2003 | Yuen | B62H 5/00 411/402 |
| 7,325,468 B1 | * | 2/2008 | Chen | B25B 13/06 81/121.1 |
| 8,739,585 B2 | * | 6/2014 | Sims | B60B 3/165 70/225 |

(Continued)

*Primary Examiner* — Lloyd A Gall
(74) *Attorney, Agent, or Firm* — Christopher G. Darrow; Darrow Mustafa PC

(57) ABSTRACT

A wheel lock key assembly includes a wheel lock key portion configured to engage with keyslot features on a wheel lock. A driving tool coupling portion is connected to the wheel lock key portion and includes a surface structured to be rotationally coupled to a driving tool so as to enable rotation of the wheel lock key portion by the driving tool by a force acting on the surface. The surface extends along a plane extending parallel to the wheel lock key portion rotational axis. A retaining member is deformable to vary a radial distance the exterior surface extends from the rotational axis. A retaining member deformation mechanism is actuatable to deform the retaining member to vary the radial distance, such that the exterior surface extends at least a predetermined distance past the plane prior to rotational coupling of the wheel lock key assembly to the driving tool.

9 Claims, 7 Drawing Sheets

(56) References Cited

U.S. PATENT DOCUMENTS

2007/0186729 A1* 8/2007 Baker .................. B25B 13/06
                                                                                     81/57.39
2018/0036874 A1* 2/2018 Liou .................... B25G 1/063

* cited by examiner

WHEEL LOCK KEY ASSEMBLY AND WHEEL LOCK KEY RETENTION MECHANISM

TECHNICAL FIELD

The present invention relates to wheel lock keys and, more particularly, to a retaining mechanism for generating an interference fit between a wheel lock key and a rotational coupling (for example, a socket) attachable to a rotatable driving tool for transferring rotation of the driving tool to the wheel lock key, to tighten a vehicle wheel lock.

BACKGROUND

Wheel locks may be applied to a vehicle wheel in place of conventional lug nuts to attach the wheel to a vehicle. The wheel locks may provide a measure of security against wheel theft. Wheel locks may be applied to the vehicle wheel using a wheel lock key having one or more keying features configured to engage in a known manner with complementary keyslot features on the wheel lock, to enable rotation of the wheel lock by the wheel lock key. The wheel lock key may be rotationally coupled to a nut runner or other rotating tool to provide rotation of the wheel lock key. The wheel lock key may be coupled to the nut runner using a socket or other rotational coupling mechanism. The wheel lock key may be inserted a complementarily-shaped cavity formed in the socket. A problem may arise after tightening of the wheel lock in that, during separation of the wheel lock key from the wheel lock, the wheel lock key may fall out of the socket. Retrieval of the wheel lock key and re-insertion of the key into the socket may waste valuable assembly time.

SUMMARY

In one aspect of the embodiments described herein, a wheel lock key assembly includes a wheel lock key portion having one or more keying features configured to engage with complementary keyslot features on a wheel lock to enable rotation of the wheel lock by the wheel lock key portion. The wheel lock key portion has a rotational axis. A driving tool coupling portion is connected to the wheel lock key portion. The driving tool coupling portion includes at least one surface structured to be rotationally coupled to a driving tool so as to enable rotation of the wheel lock key portion by the driving tool by a force acting on the at least one surface. The at least one surface extends along a plane extending parallel to the wheel lock key portion rotational axis. A retaining member is coupled to the wheel lock key portion and has an exterior surface. The retaining member is deformable to vary a radial distance the exterior surface extends from the wheel lock key portion rotational axis. A retaining member deformation mechanism is actuatable to deform the retaining member to vary the radial distance the exterior surface extends from the wheel lock key portion rotational axis, such that the exterior surface extends at least a predetermined distance past the plane prior to rotational coupling of the wheel lock key assembly to the driving tool.

In another aspect of the embodiments described herein, a wheel lock key assembly includes a wheel lock key including one or more keying features configured to engage with complementary features on a wheel lock to enable rotation of the wheel lock by the wheel lock key. The wheel lock key has a rotational axis. A retaining member is coupled to the wheel lock key and has an exterior surface. The retaining member is deformable to vary a radial distance the exterior surface extends from the wheel lock rotational axis. A retaining member deformation mechanism is actuatable to deform the retaining member to adjust the radial distance the retaining member exterior surface extends from the wheel lock rotational axis prior to rotational coupling of the wheel lock key assembly to a rotational coupling interface configured to rotationally couple the wheel lock key assembly to a driving tool, such that the retaining member exterior surface forms an interference fit with rotational coupling interface when the wheel lock key assembly is rotationally coupled to the driving tool.

In another aspect of the embodiments described herein, a method is provided for retaining rotational coupling between a wheel lock key assembly and a driving tool. The wheel lock key assembly has a driving tool coupling portion structured to be received in a socket attachable to the driving tool. The driving tool coupling portion is structured to be engageble by the socket to rotate a wheel lock key of the wheel lock key assembly. The wheel lock key has a rotational axis. The method includes steps of: securing a deformable retaining member to a portion of the wheel lock key structured to be received in the socket; and deforming the retaining member so as to displace a portion of the retaining member in a direction away from the wheel lock key rotational axis, such that an interference fit is formed between the retaining member and the socket when the retaining member and the driving tool coupling portion are received in the socket.

DETAILED DESCRIPTION

Figure 1:
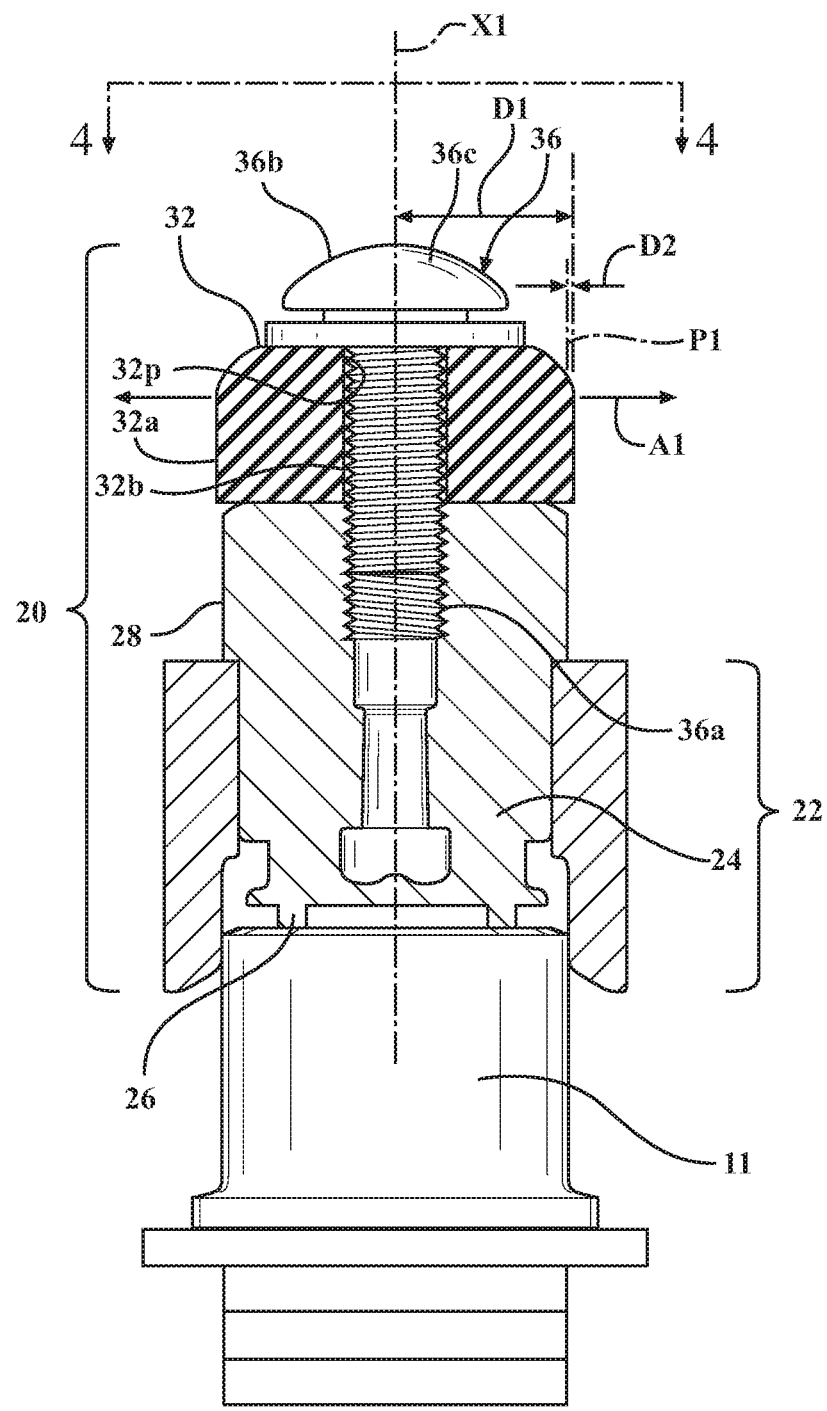
FIG. 1 is a schematic side cross-sectional view of a wheel lock key assembly in accordance with an embodiment described herein.
Figure 2:
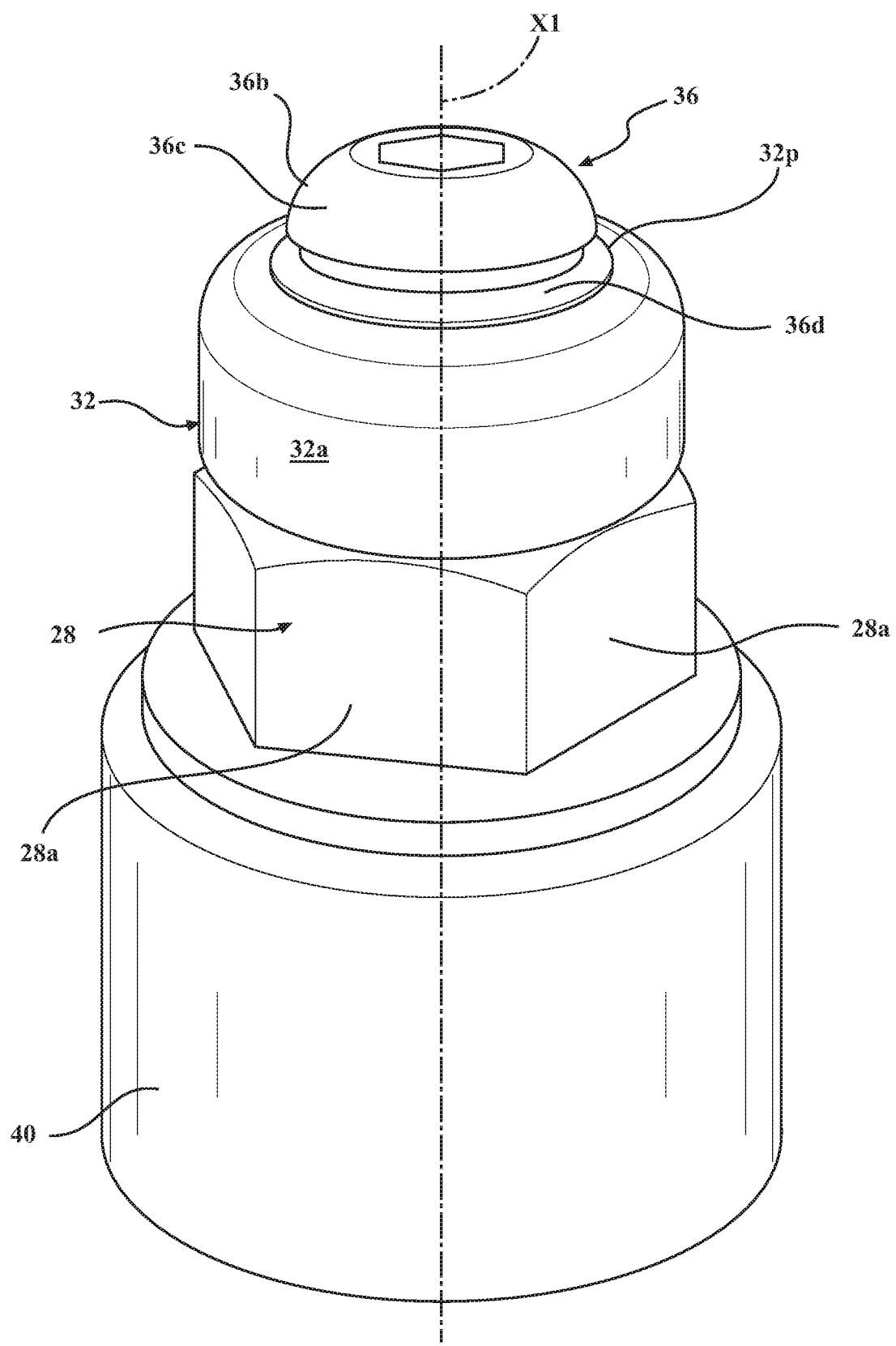
FIG. 2 is a schematic exterior perspective view of the wheel lock key assembly shown in FIG. 1.
Figure 3:
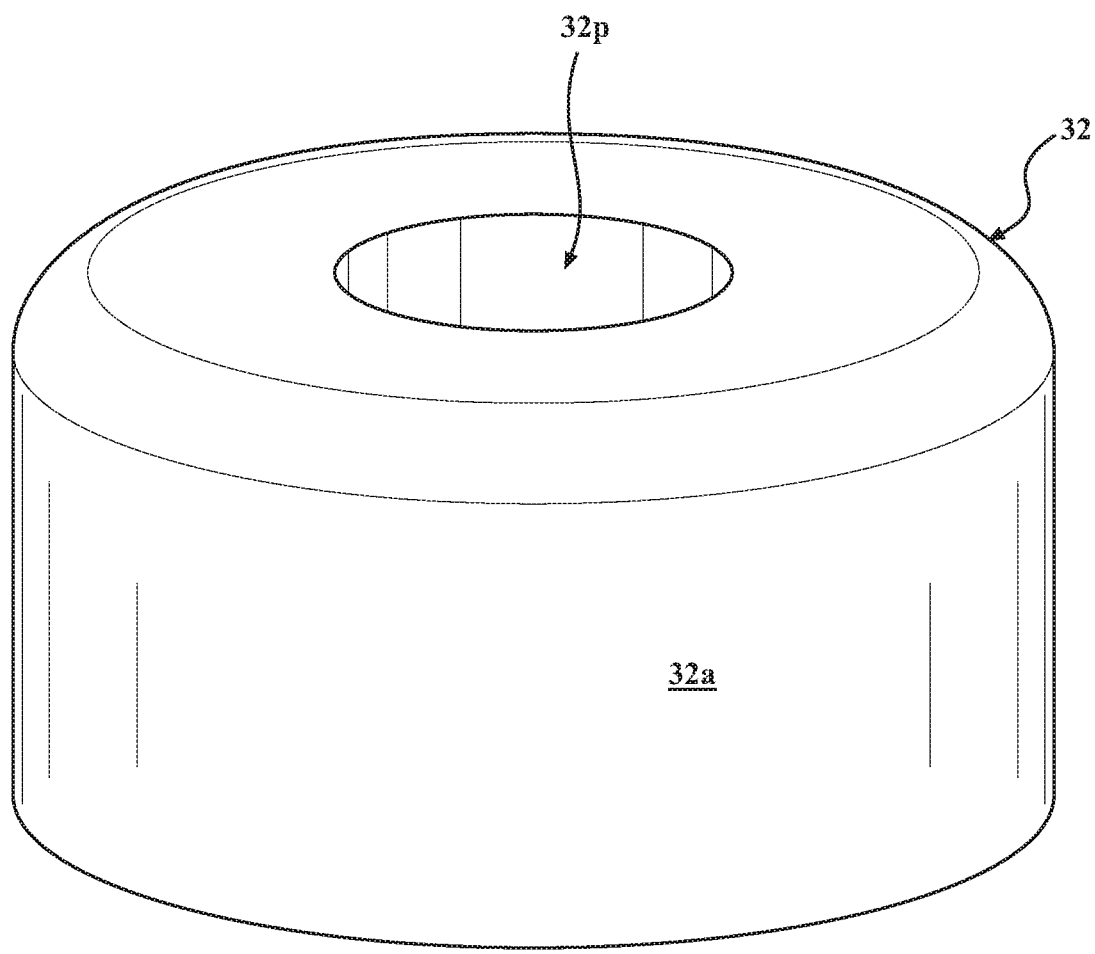
FIG. 3 is a schematic perspective view of a retaining member in accordance with an embodiment described herein.

Embodiments described herein relate to a wheel lock key assembly including a wheel lock key portion having one or more keying features configured to engage with complementary keyslot features on a wheel lock to enable rotation of the wheel lock by the wheel lock key portion. The wheel lock key portion has a rotational axis. A driving tool coupling portion is connected to the wheel lock key portion. The driving tool coupling portion includes at least one surface structured to be rotationally coupled to a driving tool so as to enable rotation of the wheel lock key portion by the driving tool by a force acting on the at least one surface. The at least one surface may extend along a plane extending parallel to the wheel lock key portion rotational axis. The driving tool coupling portion may, for example, have a hexagonal outer shape designed to engage a complementary hexagonal interior cavity of a socket, with the flats of the driving tool coupling portion extending parallel to the wheel lock key portion rotational axis. A retaining member is coupled to the wheel lock key portion and has a deformable exterior surface. A retaining member deformation mechanism is actuatable to deform the retaining member to vary the radial distance the exterior surface extends from the wheel lock key portion rotational axis, such that the exterior surface of the retaining member extends at least a predetermined distance past the plane of the at least one surface prior to rotational coupling of the wheel lock key assembly to the driving tool. For example, the retaining member deformation mechanism may include a bolt which may be tightened or loosened to correspondingly deform the retaining member, to control a radial distance the retaining member radially-outermost surface extends from the rotational axis. This dimension controls a degree of interference fit between the retaining member and the socket when the retaining member and the driving tool coupling portion are inserted into the hex cavity of the socket.

In the embodiments described herein, similar elements of different embodiments have similar reference characters or labels, unless otherwise stated.

FIGS. 1-6B illustrate an embodiment of a wheel lock key assembly 20 usable for tightening a wheel lock 11 to attach a wheel (not shown) to a vehicle, and also for loosening the wheel lock to permit the wheel to be removed from the vehicle. FIG. 1 is a side cross-sectional view of a wheel lock key assembly 20 in accordance with an embodiment described herein. The wheel lock key assembly 20 may include a wheel lock key 22. The wheel lock key 22 may include a key portion 24 including one or more keying features 26 configured to engage in a known manner with complementary keyslot features on a wheel lock 11 to enable rotation of the wheel lock by the wheel lock key portion 24. The wheel lock key 22 and assembly 20 may have a rotational axis X1.

Figure 5:
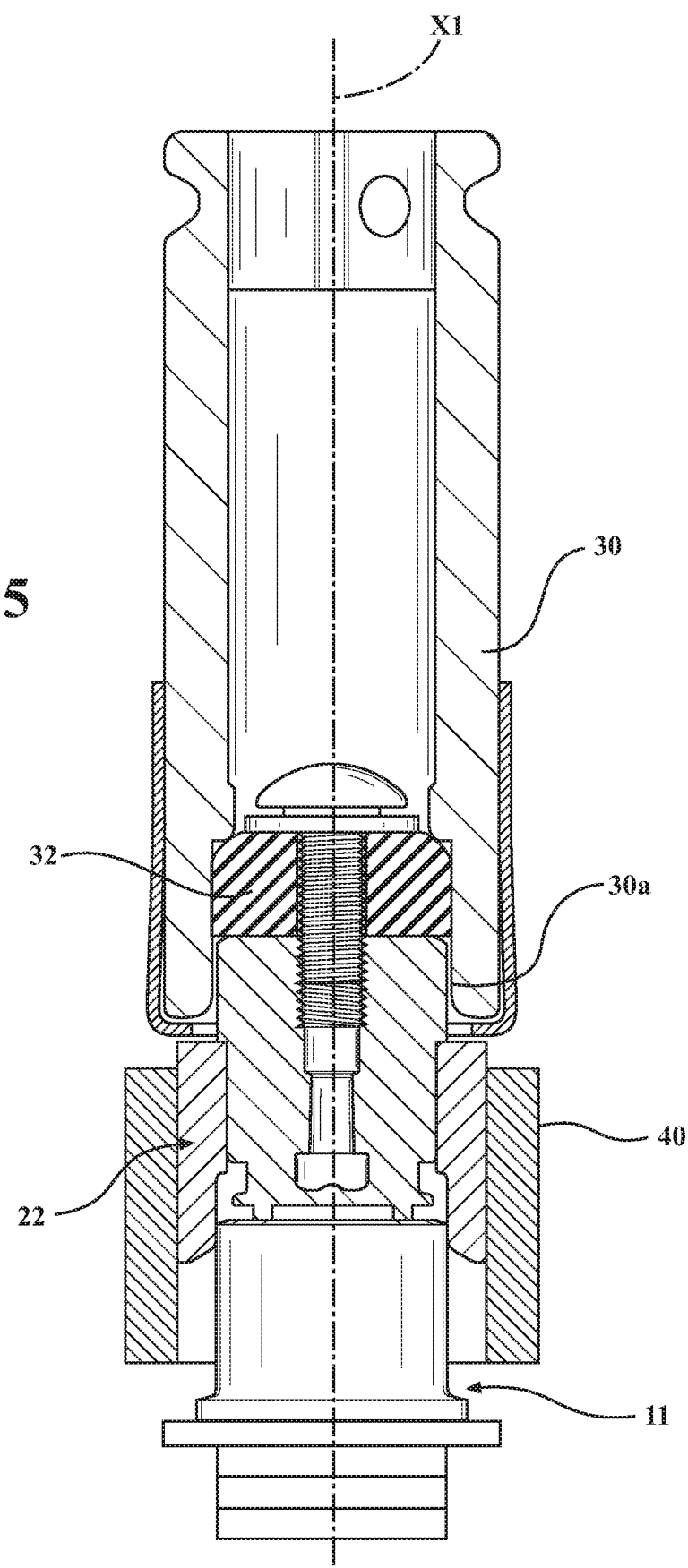
FIG. 5 is a schematic cross-sectional view of the wheel lock key assembly shown in FIG. 1 inserted into a socket and with an interference fit formed between the retaining member and interior walls of the socket.
Figure 7:
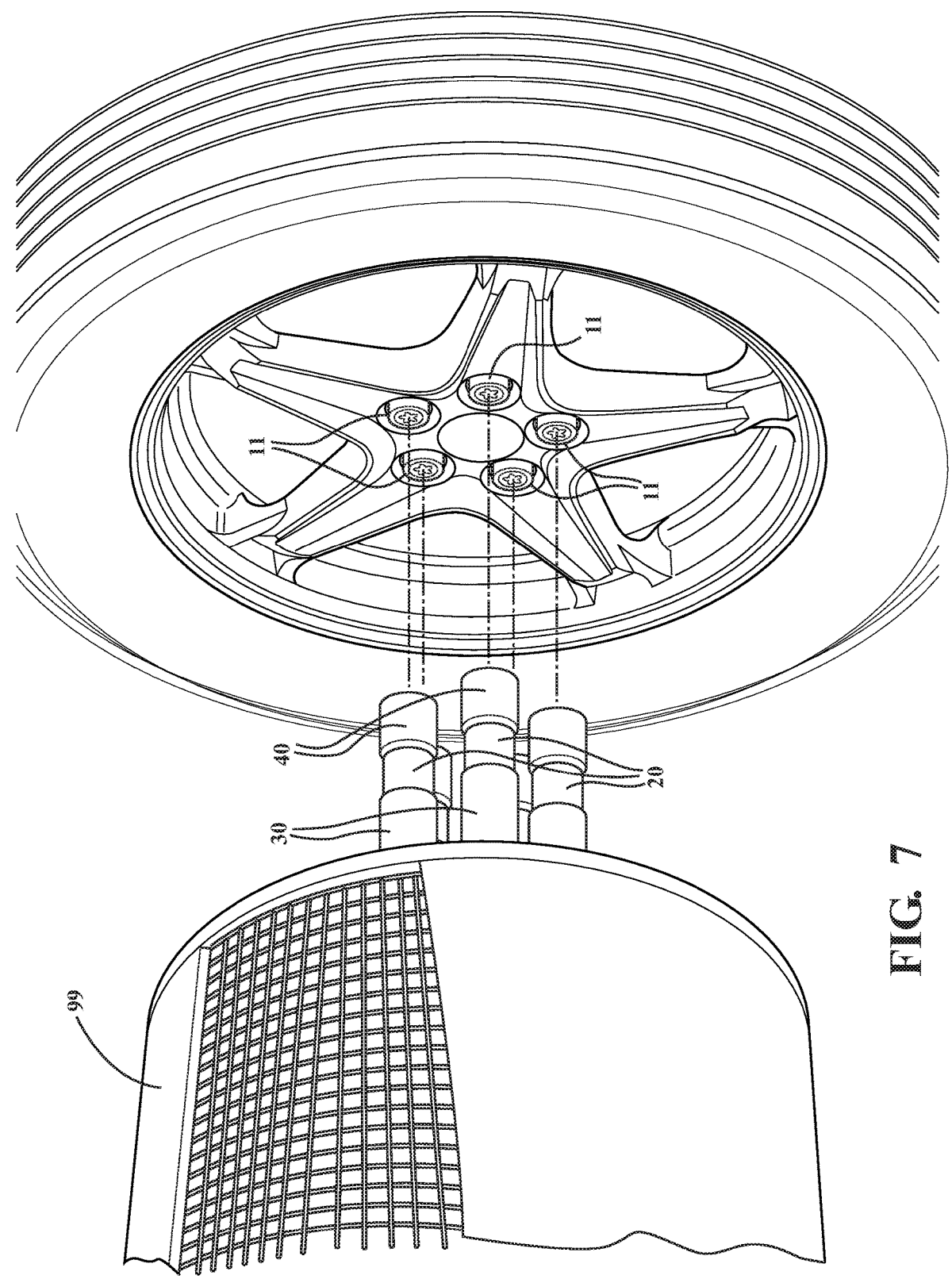
FIG. 7 is a schematic view of a multiple-spindle nut runner, with each spindle of the nut runner having an associated wheel lock key assembly mounted thereon, each wheel lock key assembly being configured in accordance with an embodiment described herein.

The wheel lock key assembly 20 may also include a driving tool coupling portion 28 rigidly connected to the wheel lock key portion 24. The driving tool coupling portion 28 may be structured for rotationally coupling the wheel lock key portion 24 to a driving tool (such as a nut runner 99 as shown in FIG. 7). Rotational coupling of the wheel lock key assembly 20 to the driving tool is understood to mean connecting (either directly, by actual physical contact, or indirectly, through one or more other components) the wheel lock key assembly 20 to the driving tool, such that rotation of the driving tool will be transferred to the wheel lock key assembly, and such that the wheel lock key assembly 20 is able to contact a wheel lock 11 to rotate the wheel lock. For example, as seen in FIG. 5, the wheel lock key assembly 20 may be indirectly connected to the driving tool using a socket 30 as the rotational coupling interface. Alternatively, the driving tool coupling portion 28 of the wheel lock key assembly 20 may be configured to attach directly to a rotatable spindle of a nut runner or other rotating assembly tool, thereby using the spindle of the driving tool as the rotational coupling interface. Other rotational coupling arrangements are also possible.

In one or more arrangements, the driving tool coupling portion 28 may include at least one surface 28a structured to be rotationally coupled to a driving tool so as to enable rotation of the wheel lock key portion 24 by a force exerted by the driving tool and transmitted to the at least one surface. In particular arrangements, the driving tool coupling portion 28 may include a plurality of surfaces 28a structured to engage internal walls of a socket (such as socket 30) during rotation of the driving tool. The socket 30 may be connectible to the driving tool and may be usable as an interface for rotationally coupling the wheel lock key assembly 20 to the driving tool. Using the socket 30, rotation of the nut runner 99 may be transferred to the wheel lock key assembly 20 to rotate the wheel lock.

In one or more arrangements, the portion of the rotational coupling interface engaging the driving tool coupling portion 28 may be shaped so as to conform to or complement the shape of the driving tool coupling portion 28. For example, in one or more arrangements and referring to FIGS. 2 and 4, radially-outermost surfaces 28a of the driving tool coupling portion 28 may be configured in a hexagonal shape, and the portions of the socket 30 engaging the driving tool coupling portion 28 may form the walls of a complementarily-hexagonally shaped cavity 30a formed in the socket 30. In this case, each of the hex constituent surfaces 28a may extend parallel to the rotational axis X1. Thus, each surface 28a may extend along a corresponding plane P1 which extends parallel to the rotational axis X1. Any surface 28a acted on by the socket to rotate the wheel lock key assembly 20 may include the flat of the hex and the ends of the flat where adjacent flats of the hex intersect.

The cavity walls may be configured to be slightly spaced apart from associated outer surfaces of the driving tool coupling portion 28 to provide insertion clearance. Alternatively, the driving tool coupling portion 28 and the portion of the socket 30 engaging the driving tool coupling portion may have other shapes (for example, octagonal, rectangular, etc.) suitable for rotationally coupling the wheel lock key portion 24 to the driving tool. A radial distance with respect to the rotational axis X1 is a distance extending radially outwardly or perpendicularly from the axis X1.

Figure 4:
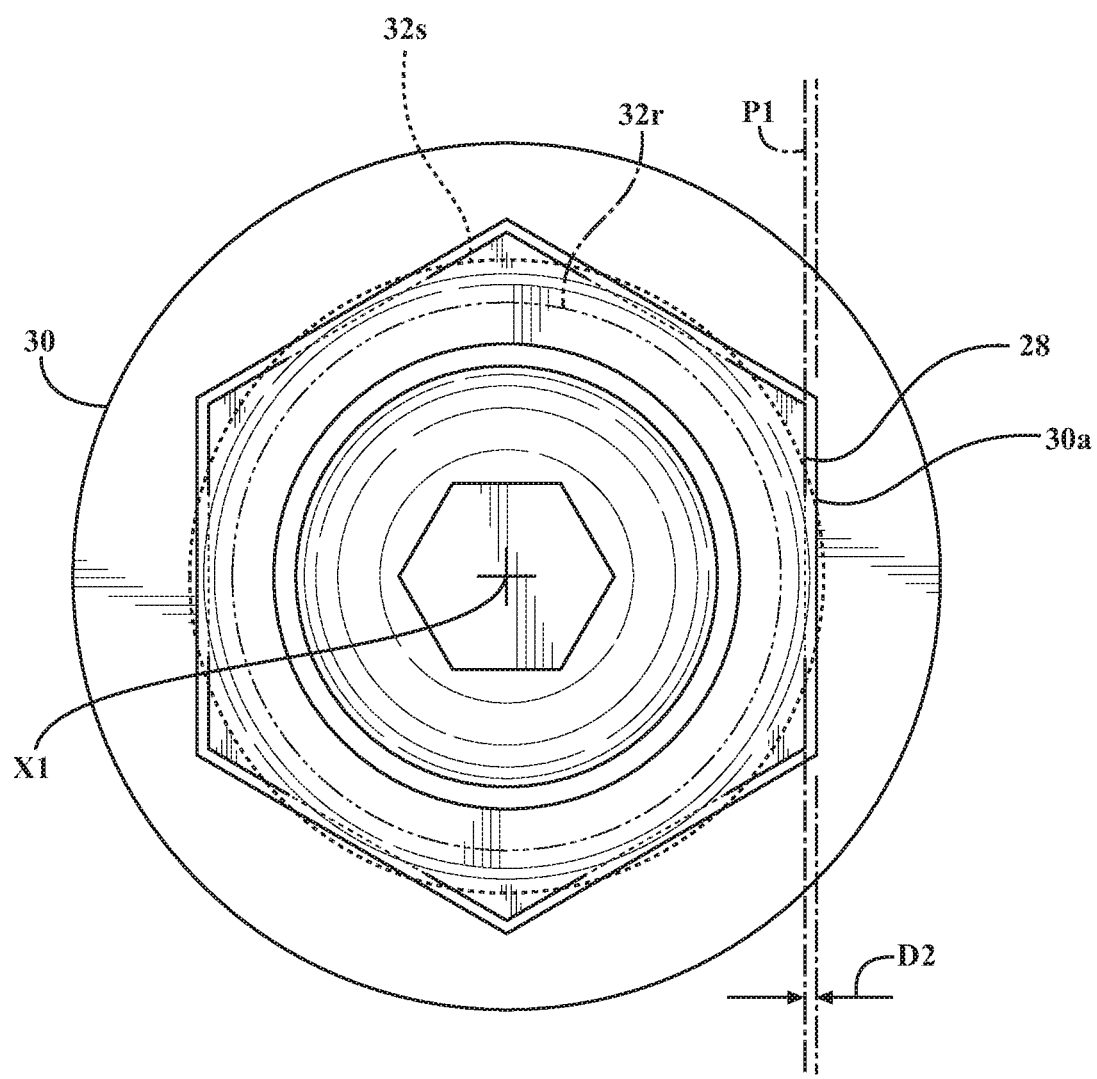
FIG. 4 is a schematic plan view of the wheel lock key assembly shown in FIG. 1, showing the retaining member of FIG. 2 secured to an end of a driving tool coupling portion of the wheel lock key assembly, and showing the retaining member before deformation and after deformation to form an interference fit with a socket.

Referring to FIGS. 1 and 4, as stated previously, the at least one surface 28a of the driving tool coupling portion 28 structured to be coupled to a driving tool engageable by a portion of the driving tool may extend along a plane P1 extending parallel to the rotational axis X1. A retaining member 32 may be coupled to the wheel lock key portion 24. For example, as shown in FIGS. 1, 2, 4, and 5, the retaining member 32 may be attached to an end of the driving tool coupling portion 28 spaced apart from the wheel lock key portion 24. Retaining member 32 may have a radially-outermost exterior surface, generally designated 32a. The radially-outermost exterior surface 32a may be a surface of the retaining member which extends the greatest distance radially outwardly from the rotational axis X1. The retaining member 32 may be deformable to vary a radial distance D1 the exterior surface 32a extends from the wheel lock key portion rotational axis X1.

The retaining member 32 may be formed from a rubber compound or an elastomeric material. In particular embodiments, the retaining member 32 may be formed from a nylon. In one or more arrangements, the retaining member 32 is structured to be resiliently deformable (i.e., the retaining member 32 is deformable from a first configuration to a second configuration by application of a force, and will return to the first configuration when the force is removed). As described herein, the retaining member 32 may be deformed and maintained in a deformed state prior to insertion of the driving tool coupling portion 28 into the socket 30, such that an interference fit is formed between the retaining member 32 and the walls defining the socket 30 when the driving tool coupling portion 28 and the retaining member are inserted into the socket cavity 30a. This interference fit is designed to be sufficient to maintain the driving tool coupling portion 28 in the socket 30 during disengagement of the wheel lock key portion 24 from the wheel lock 11.

Referring to the drawings, a retaining member deformation mechanism (generally designated 36) may be actuatable to deform the retaining member 32 to vary a radial distance D1 the retaining member outermost exterior surface 32a extends from the wheel lock key portion rotational axis X1, such that the exterior surface 32a extends at least a predetermined distance D2 past the plane P1 along which the at least one surface 28a of the driving tool coupling portion 28 extends. The retaining member 32 may be deformed prior to coupling of the wheel lock key assembly 20 to the driving tool (for example, prior to insertion of the retaining member 32 and driving tool coupling portion 28 into the socket 30).

In one or more arrangements, the retaining member 32 may include a hole 32b extending therethrough along the wheel lock key rotational axis X1. The hole 32b may be formed at a center of an end of the retaining member 32. Alternatively, the hole may be formed at a location spaced apart from a center of the retaining member, so that deformation of the retaining member by a bolt as described herein may produce an asymmetric deformation of the retaining member. Such an asymmetric deformation of the retaining member may produce an interference fit along a selected side of the wheel lock key assembly 20 when the assembly is inserted into a socket.

The retaining member deformation mechanism may include a threaded hole 36a formed in the driving tool coupling portion 28, and a bolt 36b threadedly engageable with threads in the threaded hole 36a. The retaining member deformation mechanism 36 may be configured such that rotation of the bolt 36b causes a head 36c of the bolt 36b to press against a portion of the retaining member 32, thereby "flattening out" and deforming the retaining member 32 to vary the radial distance D1 between the rotational axis X1 and the retaining member radially-outermost exterior surface 32a. The bolt 36b may be rotated until the retaining member outermost exterior surface 32a extends at least a predetermined distance D2 past the plane P1 along which the driving tool coupling portion surface 28a extends, prior to insertion of the retaining member 32 into the socket 30. The predetermined distance D2 that the retaining member radially-outermost exterior surface 32a must extend in order to provide a sufficient interference fit for the purposes described herein may be determined iteratively or by experimentation for a given set of tools. For example, the bolt 36b may be incrementally tightened and the driving tool coupling portion 28 and retaining member 32 inserted into the socket 30 to test the force required to extract the retaining member 32 from the socket.

Referring to FIG. 5, and as stated previously, socket 30 may serve as an interface for connecting the wheel lock key assembly 20 to the spindle of a nut runner, so that rotation of the nut runner is transferred to the wheel lock key assembly 20. A shroud or cover 40 may be attached to the wheel lock key 22. Cover 40 may be configured to enclose the wheel lock key/wheel lock interface during rotation of the wheel lock by the wheel lock key, to prevent user contact with the interface during rotation of the wheel lock key 22. The cover 40 may be formed from a nylon or other suitable material.

Operation of the retaining member deformation mechanism 36 will now be described with reference to FIGS. 1, 4, and 5.

FIG. 4 is a plan view of the wheel lock key assembly 20 shown in FIG. 1, showing the retaining member 32 secured to an end of the driving tool coupling portion 28 by the bolt 36b. The driving tool coupling portion 28 is shown inserted into a hexagonal cavity 30a in a complementary hexagonal socket 30. The dashed line 32r of FIG. 4 shows the retaining member 32 in an undeformed state, prior to tightening of the bolt 36b to deform the retaining member 32.

As the bolt 36b is tightened, the bolt exerts a compression force on a portion of the retaining member 32 adjacent the opening 32p of the retaining member hole 32b. This applied force deforms or "flattens out" the retaining member 32 radially, spreading the retaining member radially outwardly (including in a direction A1, for example) toward the plane P1. In one or more arrangements, the retaining member deformation mechanism 36 may include a washer 36d positioned between the head 36c of the bolt 36b and the portion of the retaining member adjacent the opening 32p of the retaining member hole 32b. Washer 36d may aid in evenly distributing the load applied by the bolt head 36c.

Continued tightening of the bolt 36b compresses the retaining member 32 until the retaining member outermost exterior surface 32a extends radially at least a predetermined distance D2 past the plane P1. When the retaining member outermost exterior surface 32a extends radially past the plane P1 (as shown by the dashed line 32s), the retaining member 32 may contact (and form an interference fit with) walls of the socket cavity 30a when the driving tool coupling portion 28 is inserted into the socket (i.e., the walls of the socket cavity 30a press radially inwardly on the expanded outer surfaces 32a of the retaining member). A compressed state of the retaining member 32 prior to insertion of the retaining member into the socket 30 is illustrated by the dashed line 32s in FIG. 4. It may be seen that, as the retaining member 32 is inserted into the socket 30, the retaining member outermost surface 32a will be compressed by the walls forming socket cavity 30a until the retaining member outermost surface 32a abuts the socket walls, thereby forming an interference fit between the retaining member outermost surface 32a and the walls forming socket cavity 30a. Insertion may continue until the driving tool coupling portion 28 is inserted into the socket.

A predetermined distance D2 needed to provide an adequate interference fit may depend on the insertion clearance between the driving tool coupling portion 28 and the walls of the socket cavity 30a, and other pertinent factors. If the retaining member hole 32b is centered along the end of the retaining member 32, the force applied by the bolt 36b may be directed along the axis X1, and the force may be applied so as to provide a substantially uniform expansion of the retaining member 32 in all radial directions away from the axis X1. As seen in FIG. 4, this condition produces multiple locations distributed around the radially-outermost exterior of the retaining member 32 where the retaining member may form an interference fit with the socket walls when the retaining member 32 is inserted into the socket 30.

Alternatively, the retaining member and the retaining member deformation mechanism may be configured as previously described to apply a force designed to create an interference fit along only a single side or portion of the wheel lock key assembly 20. The location(s) of the interference fit(s) may be tailored as desired to some degree, by the design of the retaining member (i.e., location of the retaining member hole, the shape of the retaining member, etc.) and the design of the retaining member deformation mechanism.

The interference fit formed between the retaining member 32 and the walls of the socket cavity 30a may aid in preventing the wheel lock key assembly 20 from becoming detached from the socket 30 and driving tool 99 when the wheel lock key assembly 20 and driving tool are separated from the wheel lock after the wheel lock has been tightened. Embodiments of the wheel lock key assembly described herein also enable different wheel lock keys to be rapidly and easily attached to a given driving tool and removed from the driving tool as needed, while helping to ensure that the wheel lock key remains connected to the driving tool after the wheel lock has been secured on the wheel.

In addition, the insertion depth of the bolt 36b into hole 36a may be controlled to correspondingly control the amount of radial deformation of the retaining member 32. This enables the degree of interference fit to be adjusted to compensate for wear of the retaining member 32 as the wheel lock key assembly 20 is repeatedly inserted into (and withdrawn from) the socket 30.

Figure 6A:
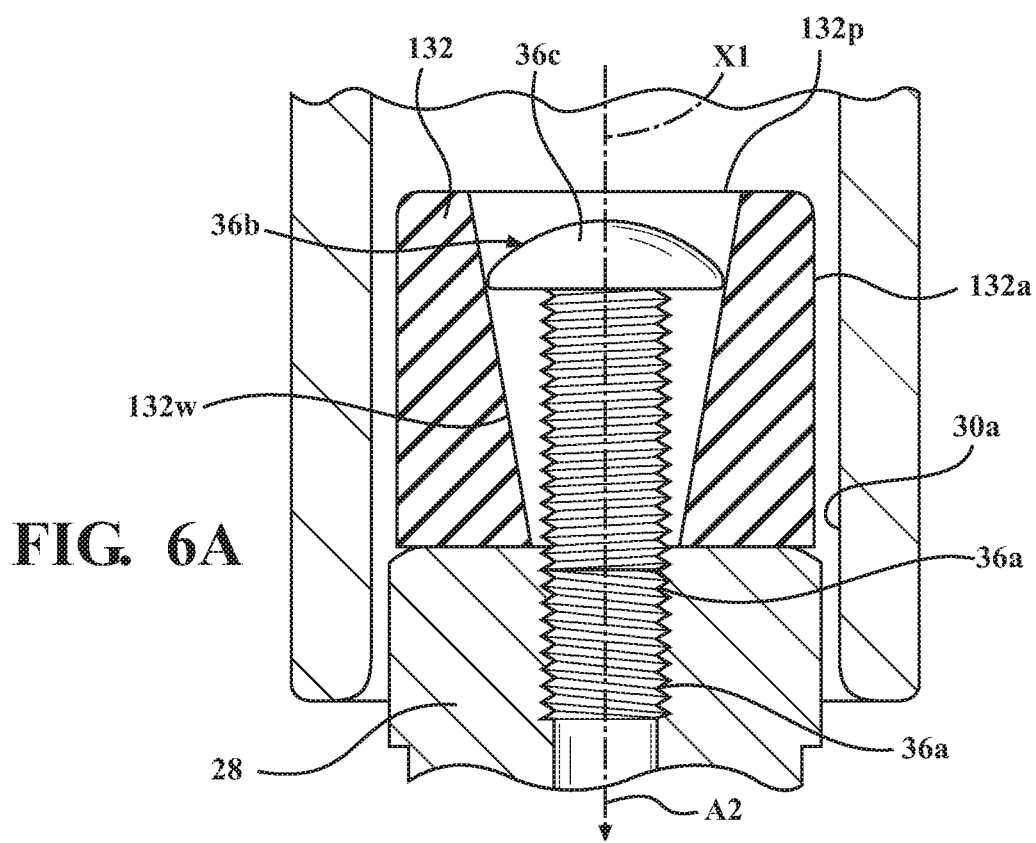
FIG. 6A is a schematic cross-sectional view of a portion of a wheel lock key assembly in accordance with another embodiment described herein, showing an alternative embodiment of a retaining member prior to being deformed to generate an interference fit between the retaining member and a socket, and showing a relationship between the walls of the socket and the retaining member prior to deformation of the retaining member.
Figure 6B:
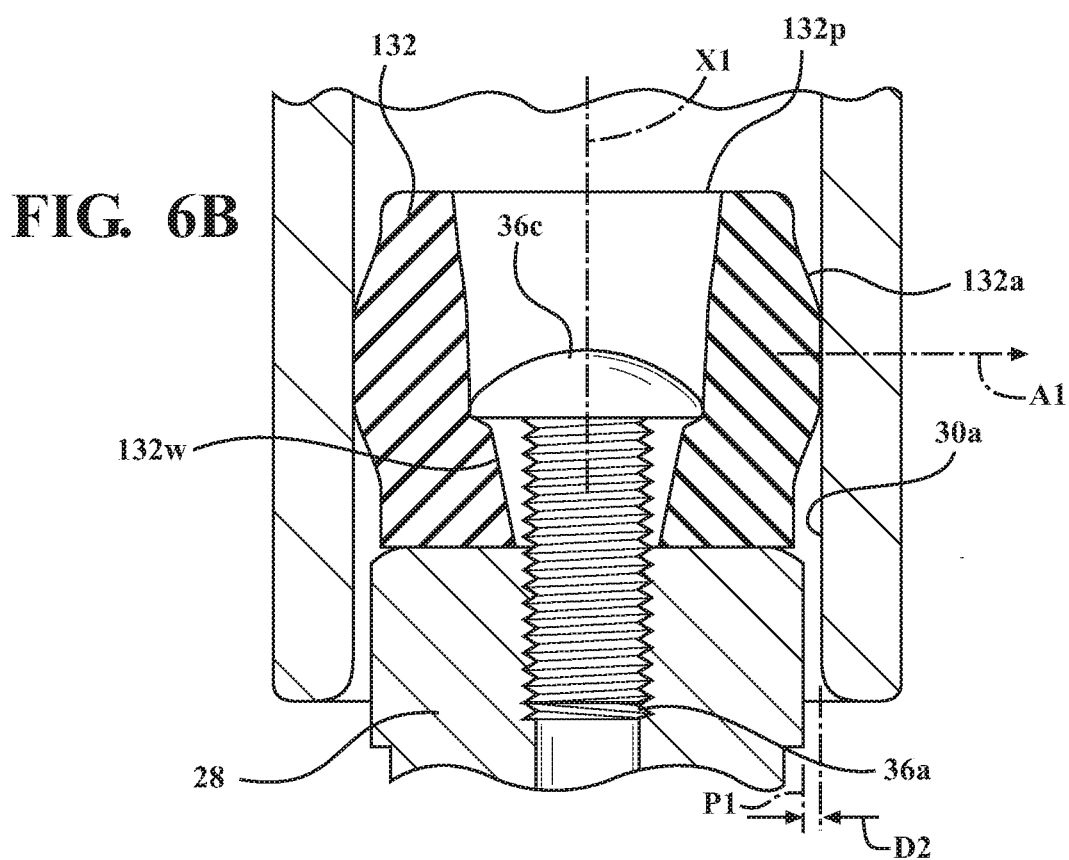
FIG. 6B is the schematic cross-sectional view of a portion of the wheel lock key assembly of FIG. 6A, showing the alternative embodiment of the retaining member inserted into the socket after the retaining member has been radially deformed to generate an interference fit between the retaining member and the socket when the retaining member is inserted into the socket.

Referring now to FIGS. 6A and 6B, in an alternative embodiment 132 of the retaining member, the retaining member hole 132b has one or more walls 132w tapering from an opening 132p of the retaining member adjacent the head 36c of the bolt 36b in a direction A2 toward the wheel lock key portion rotational axis X1. In addition, the opening 132p of the retaining member hole 132b adjacent the head 36c of the bolt 36b is structured to receive at least a portion of the head 36c of the bolt 36b therein without deforming the retaining member (as seen in FIG. 6A). FIG. 6A shows the undeformed retaining member 132 inserted into the socket to illustrate the relationship between the retaining member 132 in the undeformed state and the socket cavity 30a.

Referring to FIG. 6B, the deformation mechanism 36 may be structured so that, as rotation of the bolt 36b moves the head 36c of the bolt in direction A2 toward the wheel lock key portion 24, the head 36c of the bolt 36b contacts the one or more tapered walls 132w of the retaining member 132, causing the retaining member outermost surfaces 132a to deform in directions radially outwardly from the wheel lock key portion rotational axis X1. Thus, when the deformed retaining member 132 is inserted into the socket cavity, the deformed retaining member generates an interference fit with the socket walls as shown.

The taper of the walls 132w, in combination with the depth to which the bolt 32b is inserted into the threaded hole 36a, may be adjusted to control the extent of the interference fit, in the manner previously described. The ability to adjustably deform the retaining member 132 as described herein also permits the degree of interference fit to be adjusted to compensate for wear on the exterior surfaces of the retaining member, as the wheel lock key assembly 20 is repeatedly inserted into (and extracted from) the socket 30.

Referring now to FIG. 7, a wheel lock key assembly 20 as described herein may be coupled as previously described to an associated driving tool 99, such as a nut runner configured to rotate the wheel lock key assembly 20 to drive the wheel lock during mounting of a vehicle wheel on a vehicle when the key is mated with an associated wheel lock. A multi-spindle nut runner as shown in FIG. 7 may be used to attach the wheel locks for an entire wheel in a single operation, with each spindle of the multi-spindle nut runner having an associated socket and wheel lock key assembly connected thereto.

The drawings and the description provided herein also disclose a method of retaining a rotational coupling between a wheel lock key assembly and a driving tool, the wheel lock key assembly having a driving tool coupling portion structured to be received in a socket attachable to the driving tool, the driving tool coupling portion being structured to be engageble by the socket to rotate a wheel lock key of the wheel lock key assembly, the wheel lock key having a rotational axis. The method includes steps of: securing a deformable retaining member to a portion of the wheel lock key structured to be received in the socket; and deforming the retaining member so as to displace a portion of the retaining member in a direction away from the wheel lock key rotational axis, such that an interference fit is formed between the retaining member and the socket when the retaining member and the driving tool coupling portion are received in the socket.

In the above detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The phrase "at least one of . . . and . . . " as used herein refers to and encompasses any and all possible combinations of one or more of the associated listed items. As an example, the phrase "at least one of A, B and C" includes A only, B only, C only, or any combination thereof (e.g. AB, AC, BC or ABC).

Aspects herein can be embodied in other forms without departing from the spirit or essential attributes thereof. Accordingly, reference should be made to the following claims, rather than to the foregoing specification, as indicating the scope of the invention.

What is claimed is:

1. A wheel lock key assembly comprising:
   a wheel lock key portion including one or more keying features configured to engage with complementary keyslot features on a wheel lock to enable rotation of the wheel lock by the wheel lock key portion, the wheel lock key portion having a rotational axis;

a driving tool coupling portion connected to the wheel lock key portion, the driving tool coupling portion including at least one surface structured to be rotationally coupled to a driving tool so as to enable rotation of the wheel lock key portion by the driving tool by a force acting on the at least one surface, the at least one surface extending along a plane extending parallel to the wheel lock key portion rotational axis;

a retaining member coupled to the wheel lock key portion and having an exterior surface, the retaining member being deformable to vary a radial distance the exterior surface extends from the wheel lock key portion rotational axis; and a retaining member deformation mechanism actuatable to deform the retaining member to vary the radial distance the exterior surface extends from the wheel lock key portion rotational axis, such that the exterior surface extends at least a predetermined distance past the plane prior to rotational coupling of the wheel lock key assembly to the driving tool.

2. The wheel lock key assembly of claim 1, wherein the retaining member is structured to be resiliently deformable.

3. The wheel lock key assembly of claim 1, wherein the retaining member includes a hole extending therethrough along the wheel lock key portion rotational axis, wherein the retaining member deformation mechanism comprises:
   a threaded hole formed in the driving tool coupling portion, and
   a bolt threadedly engagable with threads in the threaded hole, such that rotation of the bolt causes a head of the bolt to press against a portion of the retaining member, thereby deforming the retaining member to vary the radial distance.

4. The wheel lock key assembly of claim 3, wherein the head of the bolt exerts a compression force on a portion of the exterior surface of the retaining member adjacent an opening of the retaining member hole to deform the retaining member to vary the radial distance.

5. The wheel lock key assembly of claim 4, wherein the retaining member deformation mechanism further comprises a washer positioned between the head of the bolt and the portion of the exterior surface of the retaining member adjacent the opening of the retaining member hole.

6. The wheel lock key assembly of claim 3, wherein the retaining member hole has one or more walls tapering from an opening of the retaining member adjacent the head of the bolt in a direction toward the wheel lock key portion rotational axis,
   wherein the opening of the retaining member hole adjacent the head of the bolt is structured to receive at least a portion of the head of the bolt therein without deforming the retaining member,
   wherein the deformation mechanism is structured so that rotation of the bolt moves the head of the bolt toward the wheel lock key portion,
   and wherein the retaining member deformation mechanism is structured so that the head of the bolt contacts the one or more tapering walls of the retaining member as the head of the bolt moves toward the wheel lock key portion, causing a portion of the retaining member in contact with the head of the bolt to deform in a direction away from the wheel lock key portion rotational axis.

7. A wheel lock key assembly comprising:
   a wheel lock key including one or more keying features configured to engage with complementary features on a wheel lock to enable rotation of the wheel lock by the wheel lock key, the wheel lock key having a rotational axis;
   a retaining member coupled to the wheel lock key and having an exterior surface, the retaining member being deformable to vary a radial distance the exterior surface extends from the wheel lock key rotational axis; and
   a retaining member deformation mechanism actuatable to deform the retaining member to adjust the radial distance the retaining member exterior surface extends from the wheel lock key rotational axis prior to rotational coupling of the wheel lock key assembly to a rotational coupling interface configured to rotationally couple the wheel lock key assembly to a driving tool, so that the retaining member exterior surface forms an interference fit with a rotational coupling interface when the wheel lock key assembly is rotationally coupled to the driving tool.

8. The wheel lock key assembly of claim 7, wherein the retaining member deformation mechanism comprises a bolt attaching the retaining member to the wheel lock key, and wherein the bolt is configured to deform the retaining member to adjust the radial distance when the bolt is actuated so as to move a head of the bolt in a direction toward the wheel lock key.

9. A method of retaining rotational coupling between a wheel lock key assembly and a driving tool, the wheel lock key assembly having a driving tool coupling portion structured to be received in a socket attachable to the driving tool, the driving tool coupling portion being structured to be engageble by the socket to rotate a wheel lock key of the wheel lock key assembly, the wheel lock key having a rotational axis, the method comprising steps of:
   securing a deformable retaining member to a portion of the wheel lock key structured to be received in the socket; and
   deforming the retaining member so as to displace a portion of the retaining member in a direction away from the wheel lock key rotational axis, such that an interference fit is formed between the retaining member and the socket when the retaining member and the driving tool coupling portion are received in the socket.

\* \* \* \* \*